United States Patent
Shaffer et al.

(10) Patent No.: US 8,121,133 B2
(45) Date of Patent: Feb. 21, 2012

(54) STREAM REGULATION IN A PEER TO PEER NETWORK

(75) Inventors: Shmuel Shaffer, Palo Alto, CA (US); Steven L. Christenson, Campbell, CA (US); Marcelo Oliveira, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 622 days.

(21) Appl. No.: 12/121,420

(22) Filed: May 15, 2008

(65) Prior Publication Data
US 2009/0285220 A1    Nov. 19, 2009

(51) Int. Cl.
*H04L 12/28* (2006.01)
*H04J 3/26* (2006.01)
(52) U.S. Cl. ........................................ 370/401; 370/432
(58) Field of Classification Search ........................ None
See application file for complete search history.

(56) References Cited

U.S. PATENT DOCUMENTS

| | | | |
|---|---|---|---|
| 6,279,039 B1 * | 8/2001 | Bhat et al. | 709/226 |
| 7,765,328 B2 * | 7/2010 | Bryers et al. | 709/249 |
| 2003/0189935 A1 * | 10/2003 | Warden et al. | 370/395.21 |
| 2003/0206518 A1 * | 11/2003 | Yik et al. | 370/230 |
| 2006/0023654 A1 * | 2/2006 | Koren et al. | 370/325 |
| 2006/0165103 A1 * | 7/2006 | Trudeau et al. | 370/401 |
| 2007/0201499 A1 * | 8/2007 | Kapoor et al. | 370/412 |
| 2008/0192769 A1 * | 8/2008 | Tischer et al. | 370/466 |
| 2008/0285574 A1 * | 11/2008 | Teener | 370/401 |
| 2009/0086641 A1 * | 4/2009 | Mushtaq et al. | 370/241.1 |
| 2009/0232114 A1 * | 9/2009 | Barave et al. | 370/338 |

* cited by examiner

*Primary Examiner* — Ayaz Sheikh
*Assistant Examiner* — Sori Aga
(74) *Attorney, Agent, or Firm* — Patterson & Sheridan, LLP

(57) ABSTRACT

Techniques for regulating streams in a Peer-to-Peer (P2P) network are provided. By establishing a priority of a stream, certain users may have some level of assurance that their stream will be received by other peers. The priority may be established based on a variety of parameters including, for example, an identification of the user, a communications channel used for a multicast session, and/or a role of the user.

17 Claims, 6 Drawing Sheets

RE-STREAMING
ADDING PRIORITY VALUE
TO STREAM

RE-STREAMING-STRIPPING
PRIORITY FROM STREAM

STREAM REGULATION IN A PEER TO PEER NETWORK

TECHNICAL FIELD

Embodiments of the present disclosure generally relate to networking and, more particularly, to controlling the flow of network traffic.

BACKGROUND

There are many environments where instant communications of time-critical information to a group of users is desirable or necessary. Examples of such environments include financial trading markets, news organizations and emergency response agencies. Such environments often utilize a "Hoot 'n' holler" (HnH) network to provide "always on" multiuser conferences without the need to dial into a conference.

Conventional HnH networks rely on dedicated lines between users, with circuitry that allowed a single user "the floor" for speaking (or some other form of non-voice communications). Advancements in technology have allowed for packet-based HnH floor control using internet protocol (IP) packet-based flow control in peer-to-peer (P2P) networks. In a typical implementation, most recent speakers (as identified in a source field of an IP header) may be allowed to speak in a round-robin manner, with other speakers backing off (staying quiet and listening only) when they do not have the floor.

In many applications utilizing such floor control, there is a hierarchy among users that may be important to consider when granting floor control. For example, a fire chief (or other type of leader) should always be given the floor when giving orders in an emergency response environment. Unfortunately, conventional HnH networks do not allow for flexible priority assignment.

Overview

Embodiments of the present disclosure generally provide methods and apparatus for processing multicast packets.

One method generally includes receiving multicast packets of media streams from endpoints in a network participating in a communication session, identifying at least one of the media streams that originates from an endpoint that does not support media stream priority marking within the multicast packets, retrieving a media stream priority value associated with the identified media stream, marking multicast packets of the identified media stream with the retrieved priority value, and making a decision whether or not to transmit multicast packets of the identified media stream marked with the retrieved priority to other devices participating in the session based, at least in part, on a priority policy of the network that considers the retrieved priority value.

One method generally includes receiving packets of a first stream, determining a priority value for the first stream based, at least in part, on a source of the first stream and a communications channel, modifying the first stream to include the priority value, and sending the modified first stream to one or more devices participating in a multicast session.

One embodiment provides a method for limiting a number of multicast media streams transmitted using a multicast address. The method generally includes inserting a proxy media server between one or more first network devices that support priority marking of multicast media streams and one or more second network devices that do not support marking of multicast media streams and regulating the retransmission of media streams between the first and second network devices in accordance with a priority policy.

One apparatus generally includes an interface for receiving multicast packets of media streams from endpoints in a network participating in a multicast session and stream regulation logic configured to identify at least one of the media streams that originates from an endpoint that does not support media stream priority marking within the multicast packets, retrieve a media stream priority value associated with the identified media stream, and make a decision whether or not to transmit multicast packets of the identified media stream marked with the retrieved priority to other devices participating in the multicast session based, at least in part, on a priority policy of the network that considers the retrieved priority value.

One apparatus generally includes an interface for receiving multicast packets of media streams from endpoints in a network participating in a multicast session and means for identifying at least one of the media streams that originates from an endpoint that does not support media stream priority marking within the multicast packets, retrieving a media stream priority value associated with the identified media stream, and making a decision whether or not to transmit multicast packets of the identified media stream marked with the retrieved priority to other devices participating in the multicast session based, at least in part, on a priority policy of the network that considers the retrieved priority value.

BRIEF DESCRIPTION OF THE DRAWINGS

So that features of the present disclosure can be understood in detail, a particular description of the disclosure may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

DESCRIPTION OF EXAMPLE EMBODIMENTS

Embodiments of the present disclosure provide techniques for controlling the flow of multicast streams over a P2P network. By including internal priority values, assigned based on a stream source, devices utilizing the techniques presented herein may be able to make intelligent decisions regarding whether to participate in a conversation or to wait and "listen."

For certain embodiments, internal priorities may be used in conjunction with existing packet header information, such as type of service (TOS) bits that give higher priority to time-sensitive network traffic, such as voice data. Thus, a device may decide whether to broadcast its multicast stream on a P2P network based on its own corresponding priority and the proposed flow control algorithm.

For some embodiments, the protocol presented herein may act to limit the number of speakers at any given time as does the HnH protocol. However, rather than give preference to the most recent three speakers, as in the HnH protocol, preference is given based on priority values assigned to each stream source (or user associated with the source).

Utilizing priority values to introduce the notion of precedence within streams may also help alleviate some common problems in systems utilizing HnH. For example, networks with users that are separated by long distances typically suffer due to the network latency between distance users. As an example, users on one side of the network (e.g., the far eastern side) may hear things that users on the other side of the network (e.g., the far western side) may not hear. Due to the latency, a router performing the HnH algorithm may allow speakers that appear to be more recent due to their closer proximity to the router when, in fact, a more distant user may have been the most recent speaker. By regulating streams based on priority values, however, this problem may be solved. While there may still be a delay in transport across the network, once a "distant" stream arrives with a sufficiently high priority value, the corresponding speaker will be heard.

Further, for certain embodiments, a device may act as a smart node (or proxy), allowing for interoperability between devices that support the proposed protocol and devices that do not. For example, such a smart node may receive stream packets from a device that does not support the protocol, modify the packets to include an internal priority associated with the device, and re-stream the packets to other devices that support the protocol. In the other direction, the smart node may receive stream packets with an internal priority, modify the packets to remove the internal priority, and re-stream the packets to other devices that do may support the protocol.

Example P2P Network Topology

Figure 1:
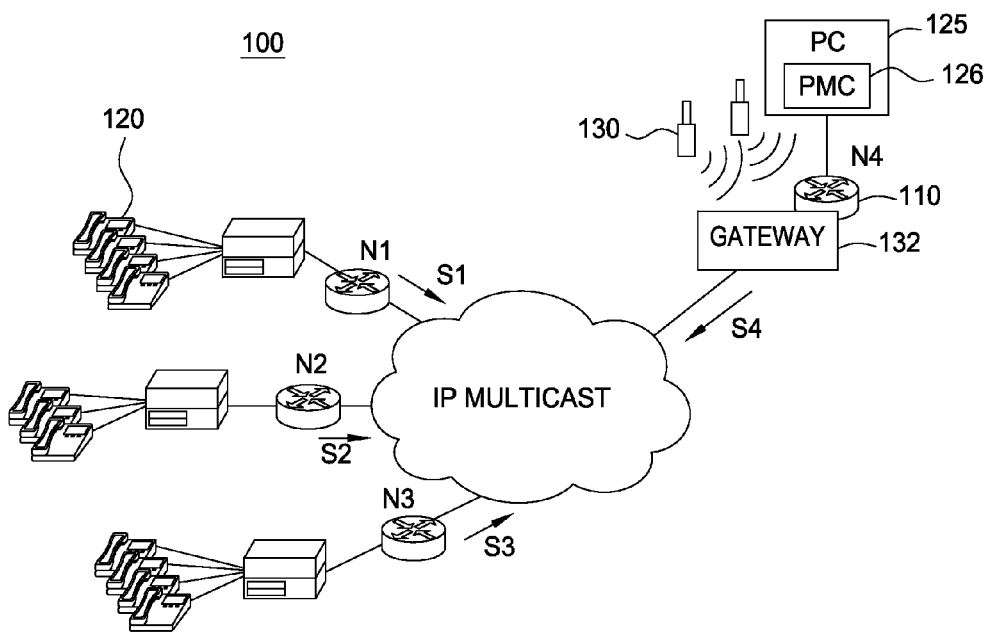
FIG. 1 is a view of an example network in which certain embodiments of the present disclosure may be utilized.

FIG. 1 illustrates an example network 100 in which embodiments of the present disclosure may be utilized to regulate streams in a multicast session. The network 100 may be, for example, any suitable IP Multicast-enabled network that allows a P2P network to be established between users via a group of peer nodes, N1-N4. For example, multiple users may participate in a virtual talk group (VTG) session, sending stream packets to other users participating in the session via the nodes N1-N4.

A multicast address may be used to host a VTG or a VTG may be created by publishing, to all participants, the multicast address over which the participants are expected to talk/communicate. A media server (MS) may be used to bridge between two or more VTGs (groups of users) and facilitate a VTG of VTGs or a "conference of conferences" thus enabling different user groups (each group using its own multicast address) to communicate with each other. While the techniques described herein may be utilized in different kinds of multi-user sessions, the following disclosure will primarily refer to VTGs to facilitate understanding.

As illustrated in FIG. 1, end users may participate in a session utilizing a variety of devices, such as IP phones 120, PCs 125, and/or or push-to-talk (PTT) radios 130. IP phones 120 may convert voice directly to packets. If the voice is transmitted in analog form (e.g., from PTT radios 130), the signals may be converted into packets by a gateway device (GW) 132 between the IP network and the analog device. The nodes N1-N4 may comprise router devices with suitable logic to stream data (e.g., voice and/or video data) from the user devices to other devices in a multicast session. In other words, the nodes may serve as media servers wherein the multicast address of a given VTG is mapped to/from another (second) multicast address. As all the other multicast addresses of other VTGs may also be mapped to/from the second multicast address, a VTG of VTGs may be established over the second multicast address.

The network may include the Internet, an Intranet, including wired and/or wireless connections that provides for multicasting. The peer nodes include devices, referred to herein as media servers, that allow communications between users from different VTGs, for example, via IP phones or push to talk (PTT) handheld devices. Such devices are commonly used in emergency response teams and other types of environments. Because of bandwidth limitations, for example, restrictions may be placed on the amount of data that may be transferred between the nodes (N1-N4) of the P2P network.

Further, for efficient communications, it may be desirable to limit which media servers VTGs can participate in a session (contributing their stream) at any given time. As an example, in order to provide coherent communications in a voice conference with multiple users, it may be desirable to control who has the floor and is allowed to speak while others listen.

It may be desirable to give priority to a particular user based on one or more criteria, such as a stream source, a corresponding user's identification, role, location, and the like. As an example, for military communications, it may be desirable to give a general a higher priority than lower ranking personnel (e.g., down to private).

Some flow control protocols, including HnH, may utilize TOS (Type Of Service) bits, for example in accordance with RFC 1349, to prioritize packets based on the type of service (e.g., to indicate the importance of a datagram and identify time sensitive traffic, such as voice data). However, these protocols do not provide different priorities for different users streaming the same type of data.

Stream Regulation Based on Internal Priorities

Techniques presented herein allow internal priority information to be associated with different streams. As will be described below, the internal priority information may include internal priority values, in some cases taken in conjunction with TOS bits. The use of internal priorities may allow streams to be regulated in a manner that gives preference to streams from particular sources and/or from particular users, for example, in an effort to ensure the right source is allowed to participate in a conversation (granted the speaking floor) when necessary. While TOS bits may be used by the routers in the IP network to prioritize the media stream's priority against other IP traffic as the media packets traverse various segments of the network, there may still be a need to provide a means for prioritizing media streams against each other, albeit these media streams may traverse the IP network along different paths. The only common network wherein the paths of these media streams intersect may be an endpoint or a Media Server (MS) associated with a given VTG.

Internal priorities may be in any suitable format that allows accommodation of an acceptable number of priority levels and may be embedded in a stream in any suitable manner. For some embodiments, an 8-bit value may be suitable or a more complex combination of bit values may be used. The internal priority may be included in a stream, for example, utilizing available (e.g., conventionally unused) bits in a packet header or other such mechanism.

Priority assignment may be performed, for example, as an administrative function when configuring nodes for deployment in a network. In such a scenario, nodes associated with higher-ranking personnel may be assigned higher priorities, such that corresponding streams are given precedence. Priorities may be assigned, for example, via standard device interfaces, such as command line interfaces and/or graphical user interfaces.

As will be described in greater detail below, priorities may be kept locally, at the node/peer level, and may also be maintained by a proxy device. As an example of a proxy device, a media server may act as an intermediary between devices that support internal priorities and devices that do not support internal priorities. Such a smart node may, for example, maintain a lookup table with priorities and their associated sources (e.g., as identified by an IP source address). When receiving a stream without internal priorities, the smart node may lookup the priority associated with the stream source, modify the stream to include the priority, and forward the modified stream. For some embodiments, devices which do not support media stream priority marking may be identified at system configuration time. Such devices may be assigned media proxy servers to facilitate marking packets of media streams originating from such devices. Corresponding lookup table (or other type data structure) entries may be created at configuration time accordingly.

For some embodiments, endpoints which do not support priority marking within a media stream may be identified during operation of the network (e.g., during a multicast session). In such cases, the system may automatically insert a proxy Media Server between the identified endpoint and other network devices.

As illustrated in FIG. 1, a PC 125 equipped with a push to talk (PTT) management center (PMC) 126 may allow PTT communication functionality, serving as a "soft radio" of sorts. While the PMC may be capable of marking media streams with the proper priority indicator and to adhere to the priority governing policy presented herein, some devices (e.g., IP phones) may not possess this capability. In order for the overall system to operate in accordance with the priority policy presented herein, the endpoints which are not programmed to adhere with the priority policy ("non-complying" devices) may be connected to the network via a proxy media server (shown in FIG. 6 and described below). In accordance with the present disclosure, a proxy media server may intercept media streams from and to non-complying endpoints and as assert the priority-based policy on their media streams.

Figure 2:
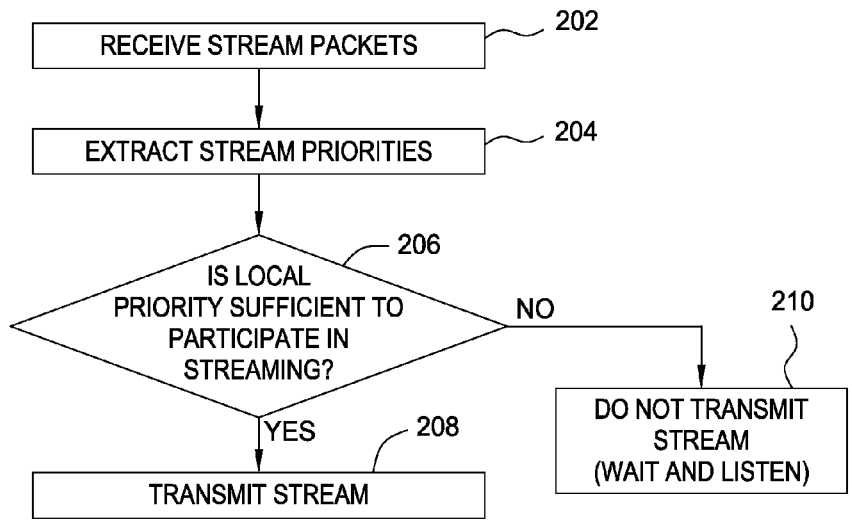
FIG. 2 is a flow chart of example operations for flow control according to certain embodiments of the present disclosure.

FIG. 2 illustrates example operations 200 that may be performed, for example, at the peer level to regulate streams in a multicast session. In other words, the operations 200 may be performed by each of the nodes N1-N4 to make independent decisions regarding whether or not to add its stream in the multicast session (e.g., to transmit or to wait and listen).

While the protocol presented herein may be used to regulate which streams are transmitted during a (VTG) session, endpoints and MS will generally always be listening and willing to receive an incoming media stream. For the transmission (speaking), an end-user will typically first attempt to talk by pressing the PTT (push to talk) button. In response, the system may check to see if there are any incoming media streams and, if so, how many and at what priority. Based on this observation (listening), and based upon the policy, the system may decide if it should transmit the media stream from the end-user or not. If the Media Server (MS) decides not to forward the media steam from a specific endpoint, it may notify the corresponding endpoint that its media stream has been dropped. This notification may be sent to the specific endpoint or to the whole VTG, for example, to alert the user's community that some media streams may have not been heard by other endpoints.

Accordingly, the operations 200 begin, at 202, by receiving stream packets. For example, a node may receive multicast packets of streams from other endpoints currently participating in the session. At 204, the priorities of the streams are extracted from the stream packets and, at 206, a determination is made whether or not to participate in streaming based on the number of received media streams, the extracted stream priorities, and a local priority.

For example, if a threshold number of streams being broadcast on the multicast address on which the endpoint is attempting to transmit have priorities higher than the local priority of the node making the decision, the node may decide not to transmit. In other words, while a node may always forward received streams on to "listening" endpoints, because of adherence to a policy, the node may elect not to transmit from an endpoint into the multicast address, at 210. On the other hand, if less than the threshold number of streams are being broadcast on the multicast address on which the endpoint is attempting to transmit, or if less than the threshold number of streams have a higher priority than the local priority, the node may decide to transmit the stream into the multicast address, at 208.

Of course, the decision to transmit or not transmit a stream from an endpoint may ultimately impact the decisions of other nodes that are also performing the operations 200. For example, if the node chooses to transmit and was not transmitting before, another node may stop transmitting a stream if it has a lower stream priority than the newly transmitted stream.

Different scenarios are illustrated in the following figures (FIGS. 3-5). The illustrated examples share the following assumptions for illustrative purposes only. The first assumption is that a maximum number of active streams to a common multicast address is three. The second assumption is that a higher value for an internal priority correlates to a higher priority. Those skilled in the art, however, will recognize that different embodiments may allow more or less than three active streams and that lower priority values may actually correlate to higher priority. Further, it should be understood that, while each end device may generate multiple media streams, a single stream is shown for each node to facilitate understanding.

Figure 3A:
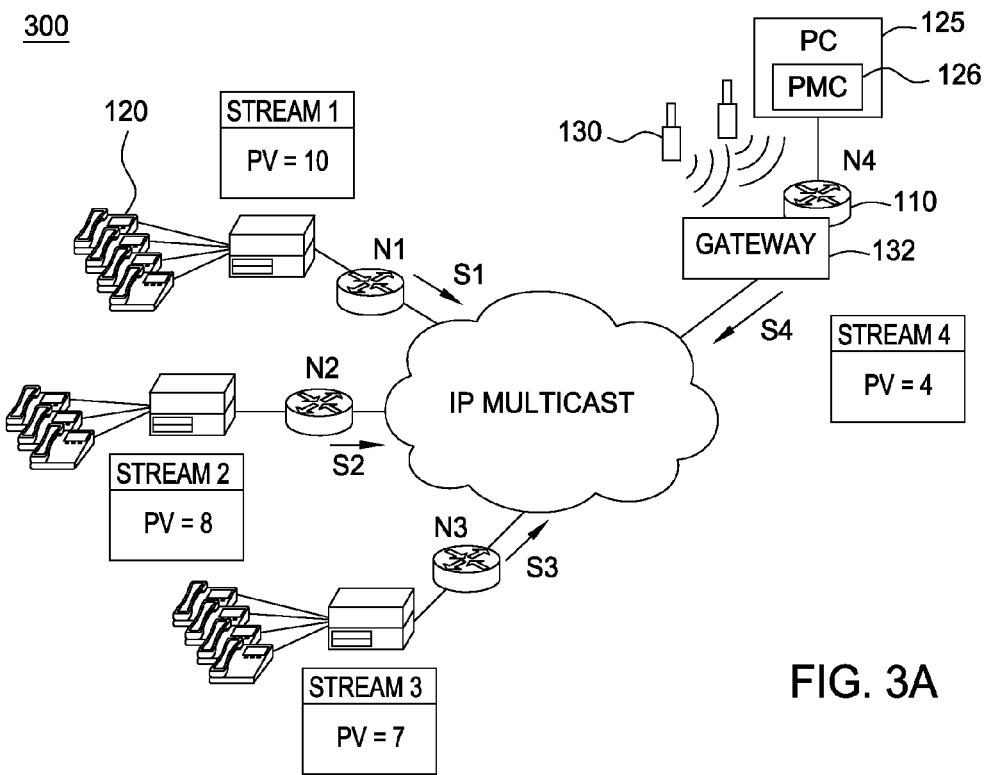
FIGS. 3A-3B illustrate various states of a network utilizing flow control according to certain embodiments of the present disclosure.
Figure 3B:
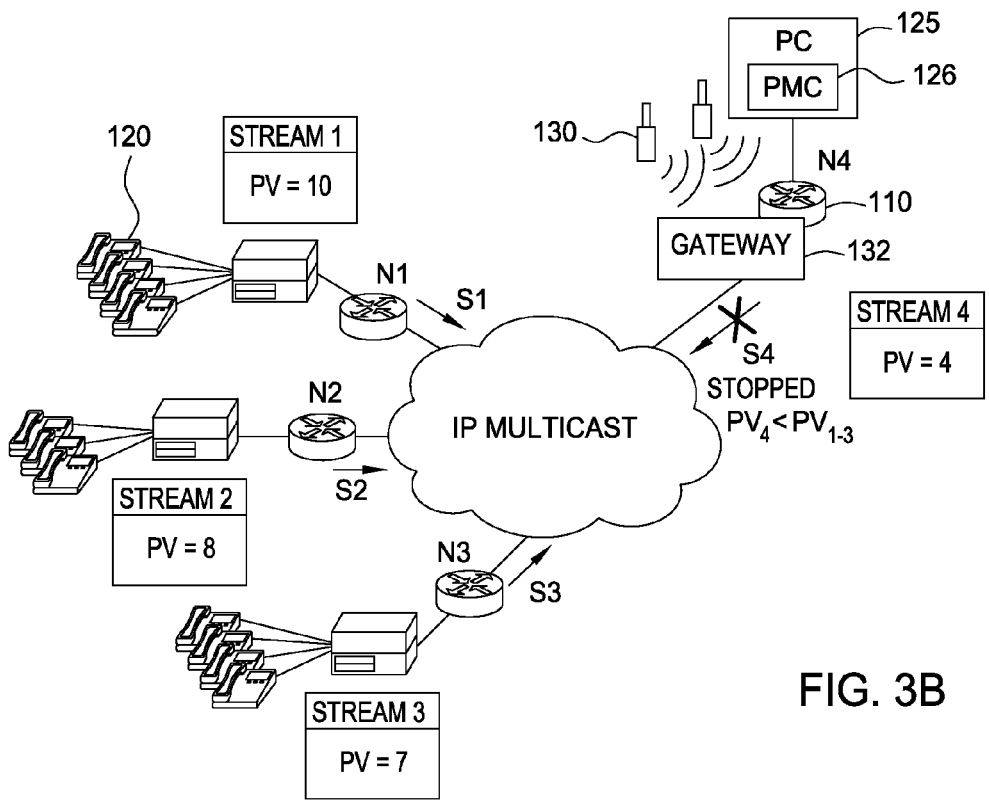

For example, FIGS. 3A and 3B illustrate the scenario when a node with a lower priority performs the operations 200 when there are already three streams with higher priority. As illustrated in FIG. 3A, nodes N1-N3 are all transmitting streams, with corresponding streams S1-S3 having internal priorities of 10, 8, and 7, respectively. N4 has an internal priority of 4, which is lower than that of N1-N3. As a result, N4 will choose not to transmit a media stream from one of its endpoints, even if a corresponding user presses the PTT button. In other words, N4 will decide not to begin streaming or, if it was streaming, N4 will stop streaming, as illustrated in FIG. 3B.

Figure 4A:
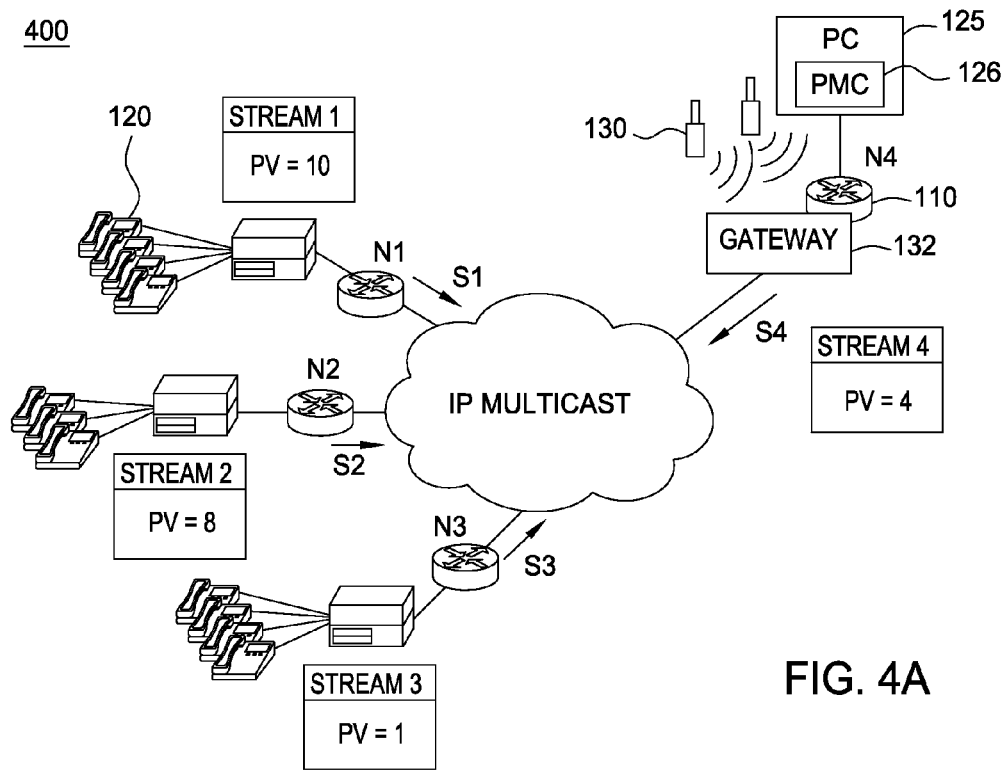
FIGS. 4A-4B illustrate various states of a network utilizing flow control according to certain embodiments of the present disclosure.
Figure 4B:
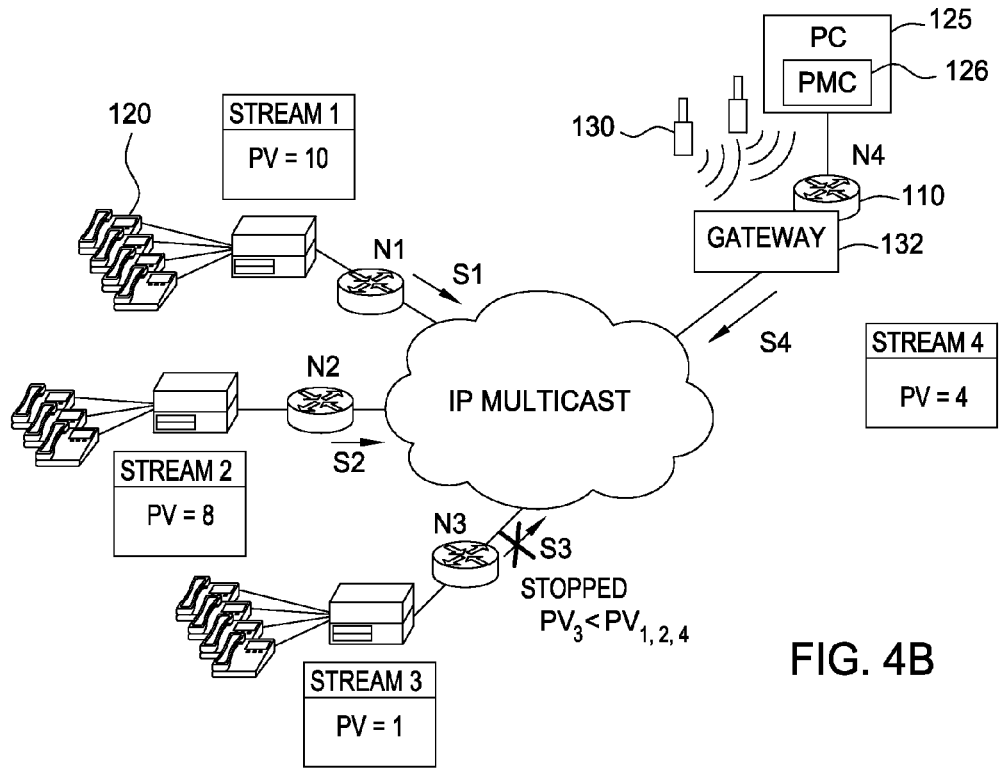

If N3 has a lower priority than N4, however, as illustrated in FIG. 4A, N4 will decide to transmit media in response to a user pressing the PTT button even though there are already three streams being broadcasted. This new transmission by N4 will result in four streams total, with three streams having a higher priority than the stream currently transmitted by N3. As a result, N3 will stop streaming, as illustrated in FIG. 4B.

Figure 5A:
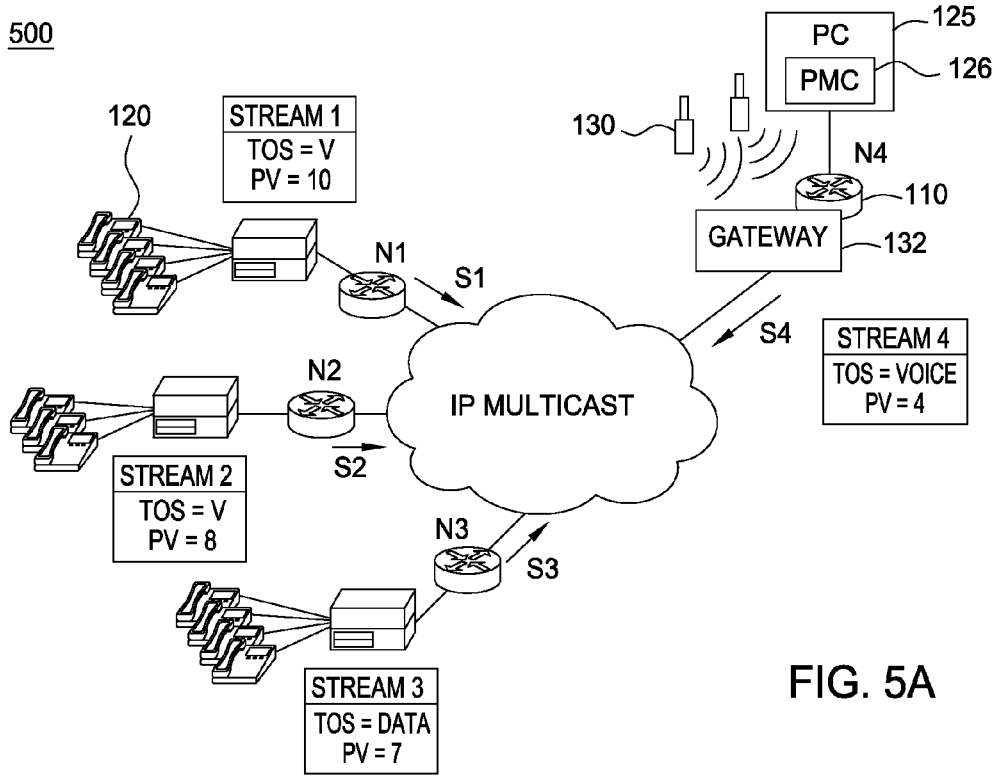
FIGS. 5A-5B illustrate various states of a network utilizing flow control according to certain embodiments of the present disclosure.
Figure 5B:
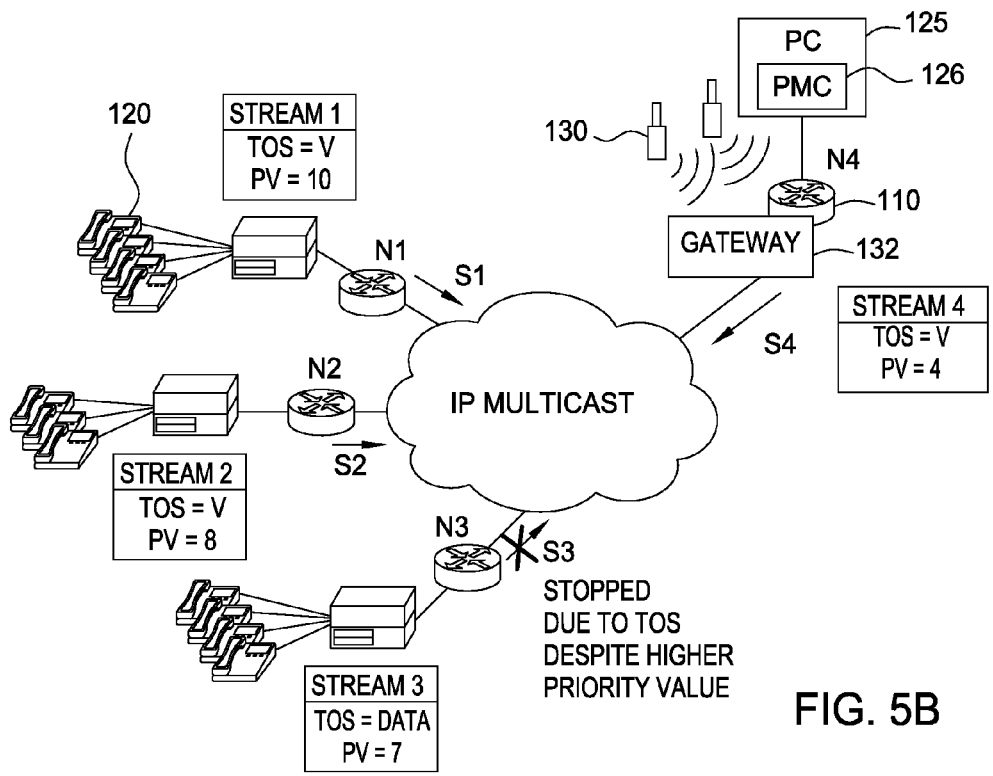

In some applications, TOS bits may be used by routers to determine the priority of multiple streams and packets traversing the network. In such cases, the internal priority values may have little or no affect if a packet does not have sufficient TOS bit settings. In the illustrated example, TOS bits are shown for voice data (designated VOIP) or non-voice data (designated DATA). As illustrated in FIGS. 5A and 5B, even if N3 has a higher internal priority value than N4 (PV=4), N3 (PV=7) may not participate in streaming if its TOS bits indicate lower priority data (e.g., N4 voice data takes precedence over N3 non-voice data).

Interoperability Via Re-Streaming

For certain embodiments, the techniques provided herein may be utilized to provide interoperability between devices that do not support the use of marking of media stream priority within the media stream ("non-complying" devices) and devices that do ("complying" devices). For example, a middle node (e.g., a media server) may act as a proxy of sorts that receives streams without internal priorities, modifies the streams to include internal priorities, and sends the modified streams (re-streams) out to devices that support internal priorities.

Figure 6:
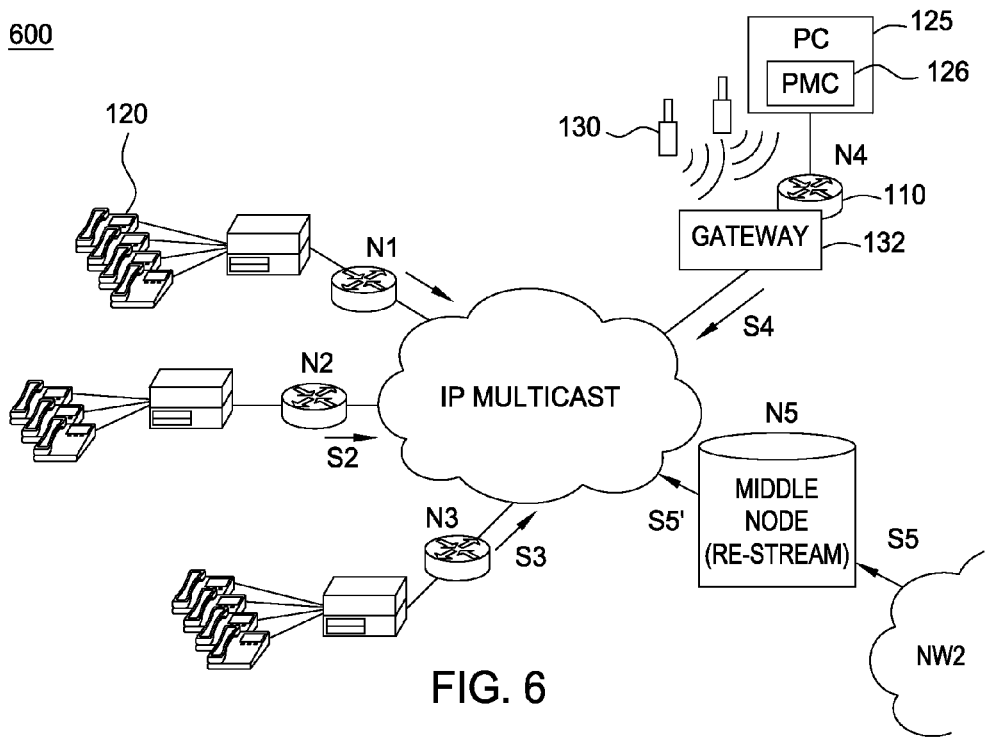
FIG. 6 illustrates an example network utilizing a re-streaming middle node according to certain embodiments of the present disclosure.

FIG. 6 illustrates a network utilizing a middle node 600 capable of re-streaming in this manner. The middle node 600 is shown as providing an interface between a second network NW2 that includes non-complying devices that do not support marking of media stream priority within the media stream. The middle node may receive a stream S5 from NW2 that does not include marking of media stream priority within the media stream and re-stream S5 as a modified stream S5' that includes a marking of media stream priority within the media stream.

Figure 7:
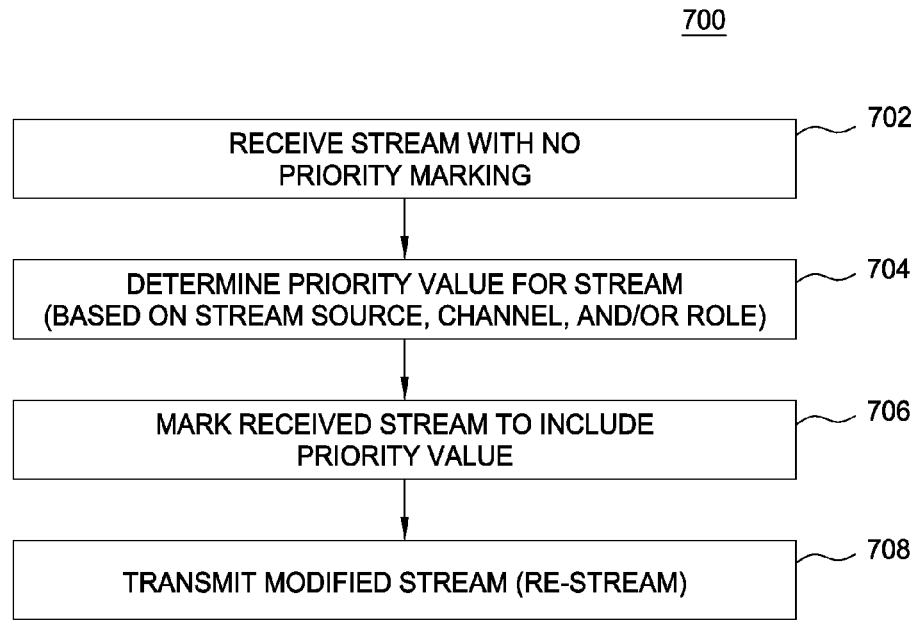
FIG. 7 is a flow chart of example operations for re-streaming according to certain embodiments of the present disclosure.

For re-streaming, the middle node 600 may perform the operations 700 shown in FIG. 7. At 702, the middle node 600 may receive, from a device or network of devices, streams that do not include priority marking. At 704, the middle node 600 determines a priority associated with the stream. At 706, the middle node modifies the stream packets to include the priority and sends the modified stream (re-streams) at 708.

For some embodiments, the middle node may determine a priority to embed in a stream based on a source of the stream (e.g., from an IP source address). For this determination, the middle node may maintain and utilize a lookup table 810 (shown in FIG. 8A) that stores priorities associated with different stream sources.

As illustrated in the table 810, a source/user may have different priority values for different communication channels (e.g., corresponding to different multicast sessions). As an example, a source corresponding to a fire chief may have a highest priority when communicating on a channel reserved for firefighters, but have a lesser priority value when communicating on other channels. Nodes N1-N4 may utilize similar lookup tables to determine local priority values to include in streams. Thus, priority marking may occur in either the endpoints themselves (that support priority marking) and/or at proxy nodes.

For some embodiments, a priority may also be assigned "dynamically" based, at least in part, on the role that a user assumes at any given time, rather than just the user identification. This allows different priority levels to be assigned the same user depending on the role that user is assuming. Further, some types of roles (a "commander-in-chief" or other such role) may have a highest authority and corresponding priority level, regardless of who the specific person assuming that role is.

Figure 8A:
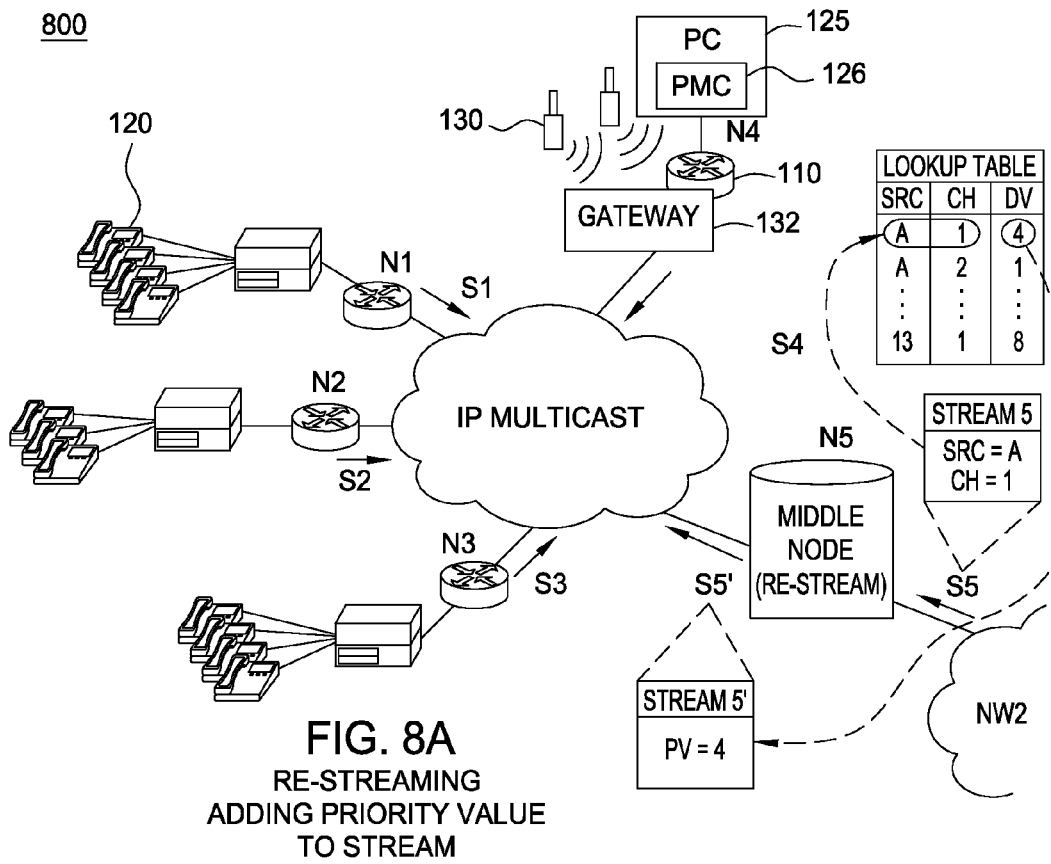
FIGS. 8A-8B illustrate a network utilizing re-streaming operations according to certain embodiments of the present disclosure.

As illustrated in FIG. 8A, the middle node 600 may receive (from another device) media stream S5 that does not contain priority marking within the media stream. Illustratively, the stream S5 is from a source A and is transmitted over communications channel 1. Using the lookup table 810, the middle node 600 retrieves a corresponding priority value of 4. The middle node modifies the stream to include this priority marking value and transmits the modified media stream S5' to nodes N1-N4.

Figure 8B:
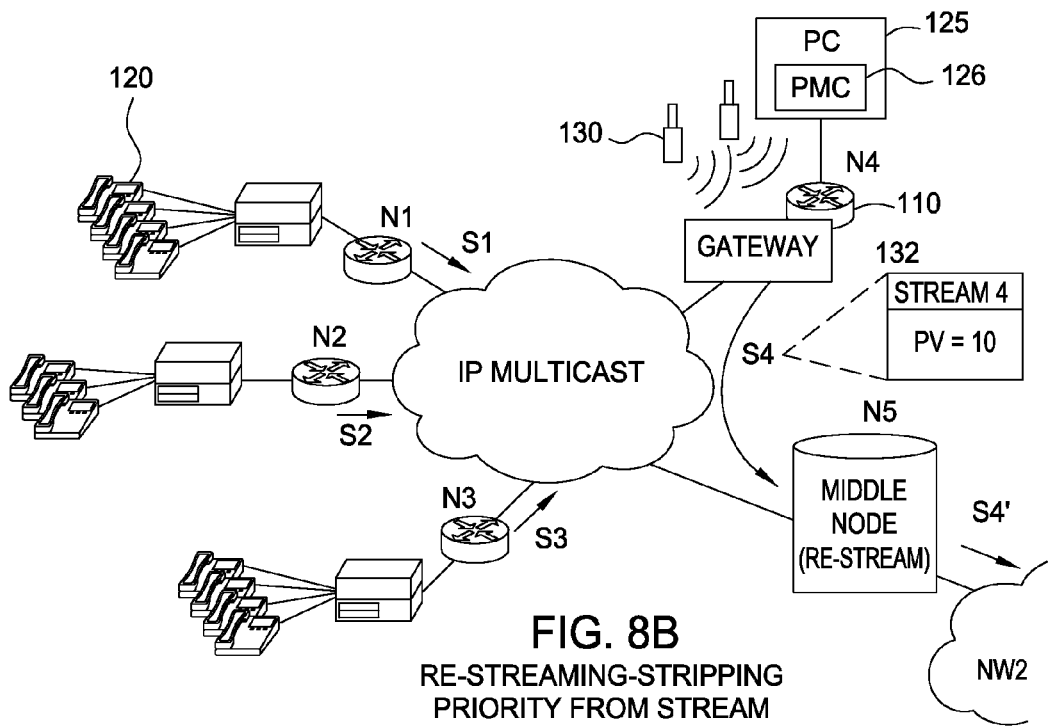

As illustrated in FIG. 8B, the middle node 600 may also regulate the flow of streams in the other direction. For example, the middle node 600 may receive a media stream S4 transmitted from node N4 with internal priority marking (PV=10), modify the stream to remove the priority marking, and transmit the modified stream out to a (non-complying) device that does not support internal priorities. FIG. 8B illustrates the middle node 600 re-streaming stream S4 (that has an internal priority value) as modified stream S4' (that does not have an internal priority value) to NW2.

The middle node (Media Server) 600 may transmit media stream over a multicast address associated with both endpoints that do support the marking of the priority within the media stream as well as endpoints which do not support the marking of priority within the media stream. As such, node 600 may transmit a stream that maintains priority marking in some cases and transmit a modified stream without priority marking in other cases.

For some embodiments, the middle node 600 may also perform operations similar to those shown in FIG. 2 before re-streaming. For example, before sending a stream that has been modified to include an internal priority, the middle node may compare the priority to those in other active streams (from nodes N1 to N3). The middle node 600 may re-stream only if the priority embedded within the media stream is sufficient. The middle node 600 may also examine the internal priorities of streams from Nodes N1-N3 before modifying the streams to remove the internal priorities and forwarding them on to a device that does not support them.

While the foregoing is directed to embodiments of the present disclosure, other and further embodiments of the disclosure may be devised without departing from the basic scope thereof, and the scope thereof is determined by the claims that follow.

The invention claimed is:
1. A method comprising:
   receiving multicast packets of media streams from endpoints in a network participating in a communication session;
   identifying at least one of the media streams that originates from an endpoint that does not support media stream priority marking within the multicast packets;
   retrieving a media stream priority value associated with the identified media stream;
   marking multicast packets of the identified media stream with the retrieved priority value; and
   determining whether to transmit multicast packets of the identified media stream marked with the retrieved priority value to endpoints participating in the session, other than the endpoint originating the identified media stream, based, at least in part, on a priority policy of the network that considers the retrieved priority value.
2. The method of claim 1, further comprising assigning a proxy media server to endpoints that do not support media stream priority marking within the multicast packets to facilitate the marking of multicast packets with the retrieved priority values.

3. The method of claim 1, wherein endpoints which do not support media stream priority marking are identified at system configuration time.

4. The method of claim 1, wherein endpoints which do not support media stream priority marking are identified by peer endpoints during a communication session.

5. The method of claim 4, wherein upon detecting an endpoint which does not support priority marking within the media stream, a proxy media server is automatically assigned between the detected endpoint and the peer endpoints.

6. The method of claim 1, wherein determining whether to transmit multicast packets of the identified media stream marked with the retrieved priority to other endpoints participating in the session comprises:
   determining a number of streams currently being transmitted over a multicast address used for the session;
   determining the priority associated with the multicast media streams; and
   deciding not to transmit multicast packets of the identified media stream marked with the retrieved priority to other devices if a threshold number of streams which are currently being transmitted over the multicast address have a higher associated priority value than the local stream.

7. The method of claim 6, further comprising notifying end users of the decision not to transmit.

8. The method of claim 1, wherein retrieving a media stream priority value associated with the identified media stream comprises retrieving a media stream priority value from a lookup table based, at least in part, on a source of the identified media stream.

9. The method of claim 1, wherein one or more of the devices participating in the multicast session comprises a push to talk radio.

10. An apparatus, comprising:
    an interface for receiving multicast packets of media streams from endpoints in a network participating in a multicast session; and
    stream regulation logic configured to identify at least one of the media streams that originates from an endpoint that does not support media stream priority marking within the multicast packets, retrieve a media stream priority value associated with the identified media stream, and determining whether to transmit multicast packets of the identified media stream marked with the retrieved priority value to endpoints participating in the multicast session, other than the endpoint originating the identified media stream, based, at least in part, on a priority policy of the network that considers the retrieved priority value.

11. The apparatus of claim 10, wherein the stream regulation logic is configured to identify endpoints which do not support media stream priority marking during a system configuration time.

12. The apparatus of claim 10, wherein the stream regulation logic is configured to identify endpoints which do not support media stream priority marking during a multicast session.

13. The apparatus of claim 10, wherein the stream regulation logic is configured to determine whether to transmit multicast packets of the identified media stream marked with the retrieved priority to other endpoints participating in the multicast session by:
    determining a number of streams currently being transmitted over a multicast address used for the multicast session;
    determining the priority associated with the multicast media streams; and
    deciding not to transmit multicast packets of the identified media stream marked with the retrieved priority to other devices if a threshold number of streams which are currently being transmitted over the multicast address have a higher associated priority value than the local stream.

14. The apparatus of claim 13, wherein the stream regulation logic is further configured to notify end users of the decision not to retransmit.

15. The apparatus of claim 10, wherein one or more of the devices participating in the multicast session comprises a push to talk radio.

16. The apparatus of claim 10, wherein the stream regulation logic is configured to retrieve a priority value associated with a media stream based, at least in part, on a user role.

17. An apparatus, comprising:
    an interface for receiving multicast packets of media streams from endpoints in a network participating in a multicast session; and
    means for identifying at least one of the media streams that originates from an endpoint that does not support media stream priority marking within the multicast packets, retrieving a media stream priority value associated with the identified media stream, and determining whether to transmit multicast packets of the identified media stream marked with the retrieved priority value to endpoints participating in the multicast session, other than the endpoint originating the identified media stream, based, at least in part, on a priority policy of the network that considers the retrieved priority value.

* * * * *